United States Patent [19]

Sekido et al.

[11] Patent Number: 5,107,406
[45] Date of Patent: Apr. 21, 1992

[54] HEAD-LAMPS

[75] Inventors: Masaji Sekido, Hadano; Masao Endo, Utsunomiya; Kazuo Nakamura, Hadano, all of Japan

[73] Assignee: Stanely Electric Co., Ltd., Japan

[21] Appl. No.: 557,942

[22] Filed: Jul. 25, 1990

[30] Foreign Application Priority Data

Jul. 27, 1989 [JP] Japan .................. 1-88179[U]

[51] Int. Cl.⁵ ............................................. B60Q 1/00
[52] U.S. Cl. ...................................... 362/61; 362/421; 362/390; 362/427; 403/115; 403/143
[58] Field of Search ............... 362/61, 80, 421, 427, 362/428, 429, 369, 390; 403/90, 115, 133, 141, 143

[56] References Cited

U.S. PATENT DOCUMENTS

| | | | |
|---|---|---|---|
| 2,855,232 | 10/1958 | Kozak | 403/143 |
| 4,568,216 | 2/1986 | Mizusawa et al. | 403/143 |
| 4,707,770 | 11/1987 | Van Duyn | 362/80 |
| 4,722,029 | 1/1988 | Ahle et al. | 362/80 |
| 4,895,693 | 1/1990 | Suzuki et al. | 362/61 |
| 4,959,758 | 9/1990 | Filosa et al. | 362/80 |
| 4,974,123 | 11/1990 | Luallin et al. | 362/421 |

FOREIGN PATENT DOCUMENTS 1486836 6/1967 France ..................... 403/115

*Primary Examiner*—Ira S. Lazarus
*Assistant Examiner*—D. M. Cox
*Attorney, Agent, or Firm*—Louis Weinstein

[57] ABSTRACT

A head-lamp having an adjuster construction comprising a pivot portion and an adjusting screw portion, in which a ball joint is provided for at least one of said portions, a part of a carrying surface of the ball joint being formed of a soft elastic member which extends into the region of the ball joint.

7 Claims, 2 Drawing Sheets

HEAD-LAMPS

BACKGROUND OF THE INVENTION

1. Field of the Invention

The present invention relates to head-lamps mounted on an automobile or the like, and more specifically to a construction of an adjuster for matching an illuminating direction with a vehicle body.

2. Description of the Prior Art

FIG. 4 shows a conventional head-lamp 51 of this kind. A pivot portion 52 and an adjusting screw portion 53 are provided on the head-lamp 51 to form an adjuster construction, in which when it is mounted on an automobile (not shown), an illuminating direction can be corrected. Normally, as the pivot portion 52, a ball joint comprising a shaft surface 52a in the form of a spherical surface and a carrying surface 52 in the form of a spherical concave surface is used. The adjusting screw portion 53 is provided with an adjusting screw 53a, a screw head receiving portion 53b and a nut 53c. The adjusting screw 53a is rotated to vary a spacing between the screw receiving portion 53b and the nut 53c to correct an illuminating direction of the head lamp 51. Since the head-lamp 51 is rotated about the pivot portion 52, a ball joint having a construction similar to said pivot portion 52 is used for either said screw head receiving portion 53b or the nut 53c (an example of the screw head receiving portion 53b is shown) to cope therewith to prevent an occurrence of variation in the rotational torque when stress applied to the adjusting screw 53a is corrected.

However, it is general in terms of hardness or ease in molding, in the conventional ball joint the shaft surface 52a is principally formed from a metal member whereas the carrying surface 52b is formed from a resin member. Therefore, the external surface is surrounded by a member having a large coefficient of thermal expansion, and a surplus fastening force is produced due to a variation in environmental temperature, resulting in an occurrence of a rotational torque of the adjusting screw 53a. There poses a problem in that for example, in an extremely cold season, correction work becomes impossible due to the aforesaid fastening force. In an extremely hot season, the rotational torque becomes extremely small, thus posing a problem in that a retentiveness of correction is lowered. These problems have been required to be solved.

SUMMARY OF THE INVENTION

For solving the above-described problems encountered in the prior art, the present invention provides a head-lamp having an adjuster construction comprising a pivot portion and an adjusting screw portion, in which a ball joint is used for at least one side, characterized by the adjuster construction in which a part of a carrying surface of said ball joint is formed from a soft elastic member. With this arrangement, a variation of the rotational torque due to a temperature differential is prevented.

DESCRIPTION OF THE PREFERRED EMBODIMENT

Figure 1:
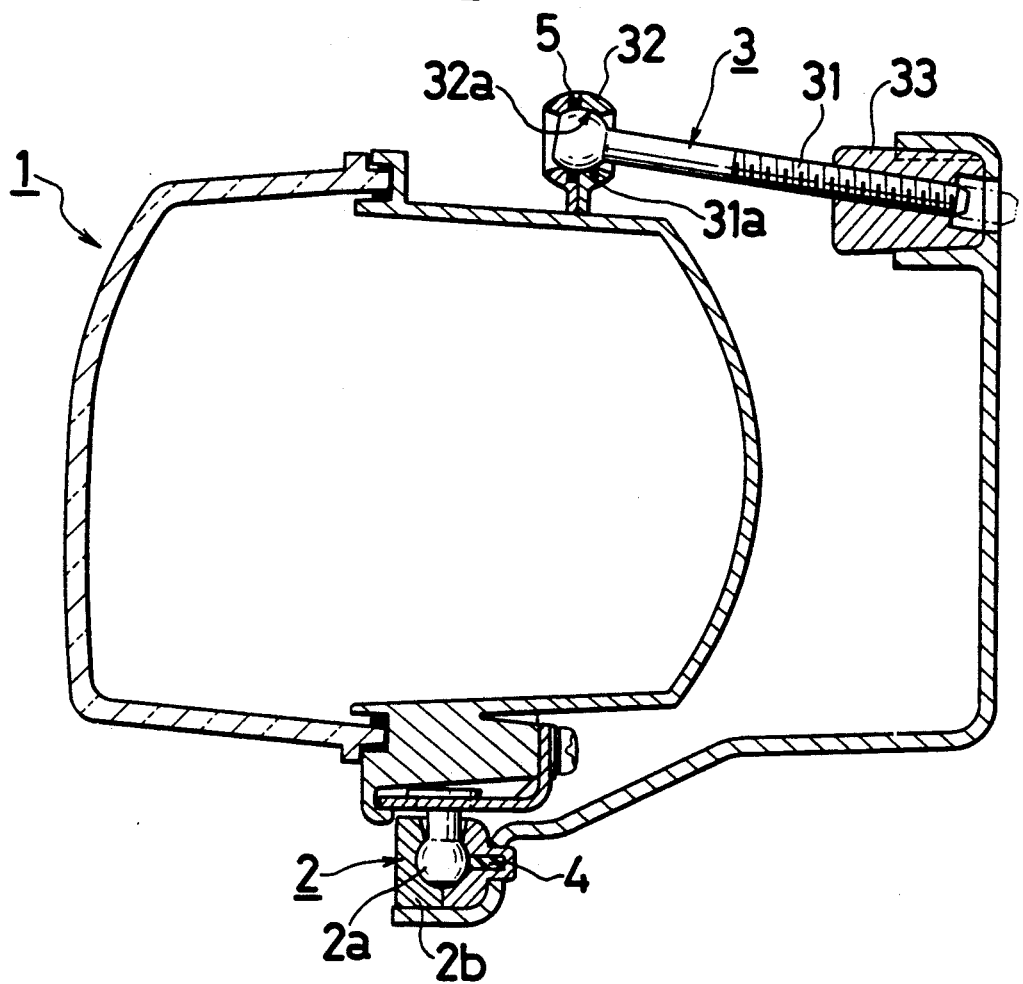
FIG. 1 is a sectional view showing one embodiment of a head-lamp according to the present invention.

In FIG. 1, a head-lamp is indicated at 1. The head-lamp 1 is provided with a pivot portion 2 and an adjusting portion 3 to form an adjuster construction, in which an illuminating direction can be corrected. The pivot portion 2 comprises a ball joint composed of a shaft surface 2a in the form of a spherical convex surface and a carrying surface 2b in the form of a spherical concave surface. On the other hand, the adjusting screw portion 3 is composed of an adjusting screw 31, a screw head receiving portion 32 and a nut 33. Similar to prior art, a head of the adjusting screw 31 is machined into a spherical surface to form a shaft surface 31a, and the screw head receiving portion 32 is formed with a carrying surface 32a to form a ball joint. According to the present invention the carrying surfaces 2b and 32b are partly formed from soft elastic members 4 and 5, for example, such as rubber.

Figure 2:
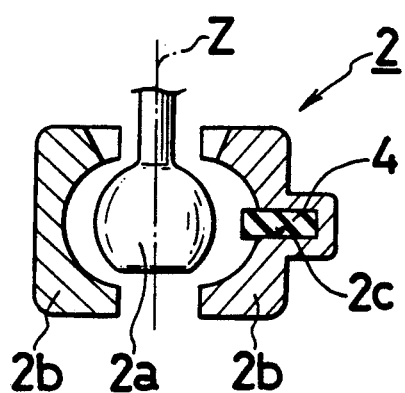
FIG. 2 is an enlarged sectional view showing essential parts of the above embodiment.

FIG. 2 shows in an enlarged scale the pivot portion 2 which constitutes an essential part. Since the carrying surface 2b is in the form of a spherical concave surface as described above, it cannot be molded in that state. Therefore, it is divided into two hemispherical concave surfaces, which are joined after the shaft surface 2a has been fitted. In this embodiment, the aforesaid division is carried out parallel with an axial direction 2 of the shaft surface 2a.

In this case, one hemispherical concave surfaces formed by dividing the carrying surface 2b is provided with a hole with a bottom 2c which is approximately at a right angle to the carrying surface. A rod-like elastic member 4 which is slightly longer than the depth of the hole with bottom 2c is inserted into the hole with bottom 2c.

Figure 3:
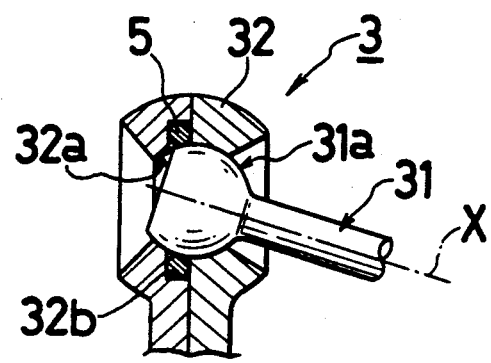
FIG. 3 is likewise an enlarged sectional view of another essential parts.
Figure 4:
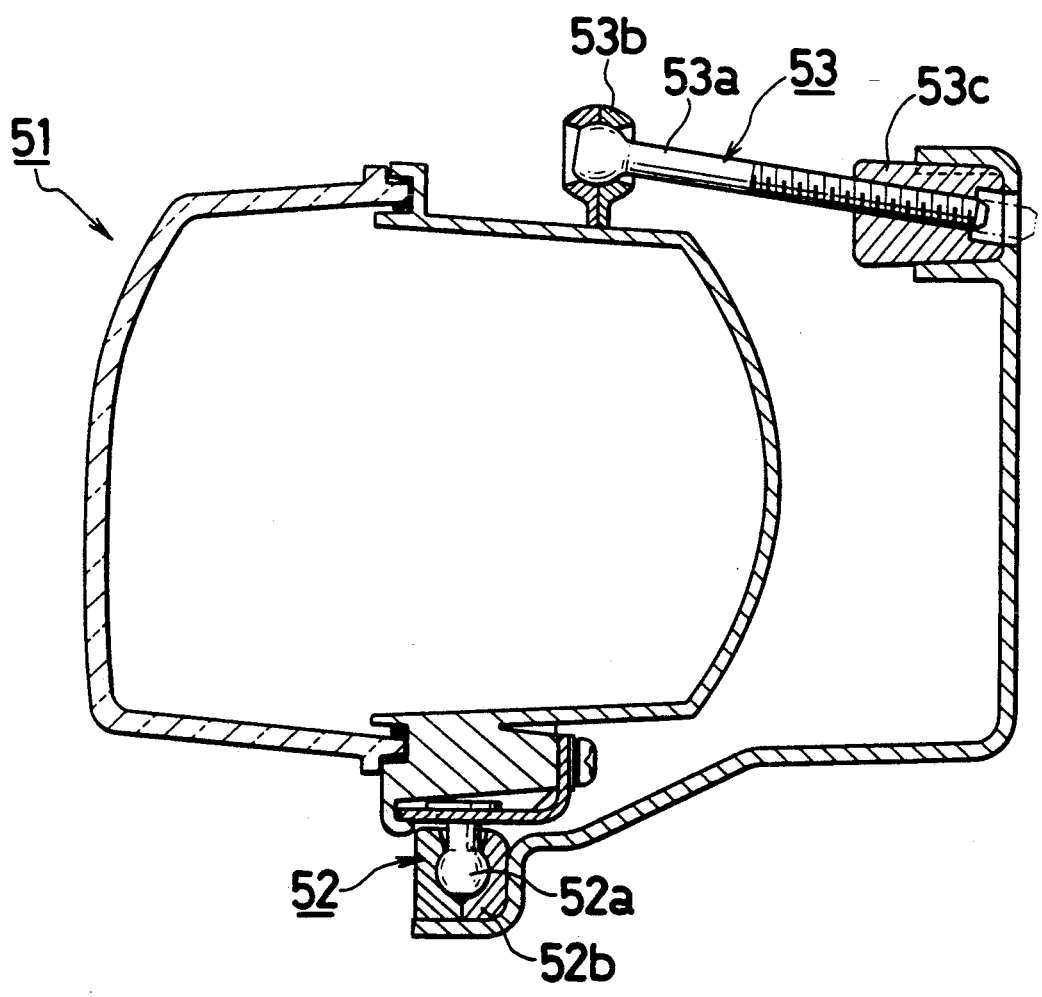
FIG. 4 is a sectional view of a conventional head-lamp.

FIG. 3 shows essential parts of the adjusting screw 3. In this example, a carrying surface 32a is divided approximately at right angles to the axial direction X of the shaft surface 31a.

In this case, one of the carrying surfaces 32a is provided with a circular groove 32b, into which is fitted an elastic member 5 commercially available as an O-ring, for example, so that the elastic member 5 is projected slightly in a direction of the shaft surface 31a.

In any of these examples as described above, the carrying surfaces 2b and 32a are formed in a proper fitting state with respect to the shaft surfaces 2a and 31a at a minimum temperature at which use of the head-lamp is expected.

The operation and effect of the present invention are as follows. The carrying surfaces 2b and 32a sides increase in size as a temperature during use rises to naturally produce a play in the shaft surfaces 2a and 31a.

Since the elastic members 4 and 5 are projected beyond the concave surfaces 26, 32a, the elastic members 4 and 5 are still in contact with the shaft surfaces 2a and 31a to absorb the play, and at the same time, torque for rotating the shaft surfaces 2a and 31a with the elasticity is prevented from being greatly varied.

As described above, according to the present invention, a head-lamp has an adjuster construction in which a part of a carrying surface of a ball joint is formed from a soft elastic member. Therefore, the present invention has an excellent advantage in that rotational torque of the adjusting screw portion caused by a variation in temperature is prevented from being greatly varied due to the elasticity of the elastic member and an occurrence of surplus fastening or play is prevented whereby correction can be made under any temperature conditions.

What is claimed is:

1. A head-lamp assembly comprising:
   a head-lamp;
   a bracket for adjustably supporting said head-lamp including means for mounting a first ball joint assembly and means for threadedly engaging an adjustment screw;
   said ball joint assembly comprising a rod-like member mounted to said head-lamp end having a spherical-shaped free end extending away from said head-lamp, and a holding assembly for slidably receiving said spherical-shaped free end including first and second assembly halves having cavities cooperating to form a hollow spherical receiving chamber generally conforming to said spherical-shaped free end;
   said holding assembly and said spherical-shaped free end being formed of materials having different coefficients of thermal expansion;
   one of said assembly halves having a recess communicating with its associated cavity;
   a soft resilient block-shaped member mounted in said recess and extending beyond said recess and into said cavity to engage the spherical-shaped free end and being compressed to absorb any play between the spherical-shaped free end and the holding assembly and for providing uniform torque between said spherical-shaped free end and said holding assembly.

2. The apparatus of claim 1 further comprising:
   a second ball joint assembly and an adjustable screw member having a threaded end threadedly engaging said screw receiving member, said adjustable screw member having a spherical-shaped head at the end of said adjustable member opposite said threaded end;
   a second holding assembly comprising:
   a pair of screw head receiving members each having an arcuate recess, said recesses being joined along a planar surface for cooperatively forming a spherical-shaped head receiving cavity cooperating with said spherical-shaped head to form said second ball joint assembly;
   said spherical-shaped head and said second holding assembly being formed of materials having different coefficients of thermal expansion;
   one of said screw head receiving members being provided with an annular recess communicating with said arcuate recess and adjacent said planar surface; and
   a soft resilient annular member being arranged in said annular recess so that at least a portion thereof projects into said spherical-shaped head receiving cavity, said annular member being compressed for reducing play between said spherical-shaped head and said second holding assembly and for providing a substantially uniform torque therebetween.

3. The apparatus of claim 2 wherein said annular member is a soft, resilient, compressible O-ring.

4. The apparatus of claim 2 wherein said annular recess is substantially parallel to said planar surface;
   said soft, resilient annular member being O-ring provided in said annular recess.

5. A head-lamp having an adjuster construction comprising a pivot portion and an adjusting screw portion, in which a ball joint comprised of a ball and a socket having a surface surrounding said ball is used for at least one of said portions, said ball and socket being formed of materials having different coefficients of thermal expansion, characterized by the adjusting screw portion construction in which a part of the socket surface of said ball joint is formed from a soft elastic member which is seated in a recess provided in the socket surface, said soft elastic member extending away from said socket surface and into the region of the ball and being partially compressed, to compensate for increased spacing between the ball and the socket due to temperature changes, for example;
   said socket being divided into two hemispherical concave surface portions, said surface portions being joined along a planar surface parallel with an axial direction of a shaft surface of an adjusting screw.

6. A head-lamp having an adjuster construction comprising pivot portion and an adjusting screw portion, in which a ball joint comprised of a ball and a socket having a surface surrounding said ball is used for at least one of said portions, said ball and socket being formed of materials having different coefficients of thermal expansion, characterized by the adjusting screw portion construction in which a part of the socket surface of said ball joint is formed from a soft elastic member which is seated in a recess provided in the socket surface, said soft elastic member extending away from said socket surface and into the region of the ball and being partially compressed, to compensate for increased spacing between the ball and the socket due to temperature changes, for example;
   said socket being comprised of a pair of socket halves joined along a planar surface arranged approximately at a right angle to an axial direction of said shaft surface.

7. A head-lamp having an adjuster construction comprising a pivot portion and an adjusting screw portion, in which a ball joint comprised of a ball and a socket having a surface surrounding said ball is used for at least one of said portions, said ball and socket being formed of materials having different coefficients of thermal expansion, characterized by the adjusting screw portion construction in which a part of the socket surface of said ball joint is formed from a soft elastic member which is seated in a recess provided in the socket surface, said soft elastic member extending away from said socket surface and into the region of the ball and being partially compressed, to compensate for increased spacing between the ball and the socket due to temperature changes, for example;
   said socket being split in half along a plane of division into a pair of socket halves, a recess being arranged along a planar surface of one of said socket halves which surrounds said socket half and is parallel with the planar line of division of said socket;
   said soft elastic member being an O-ring planed in said recess.

* * * * *

UNITED STATES PATENT AND TRADEMARK OFFICE
CERTIFICATE OF CORRECTION

PATENT NO. : 5,107,406
DATED : April 21, 1992
INVENTOR(S) : Sekido et al.

It is certified that error appears in the above-identified patent and that said Letters Patent is hereby corrected as shown below:

On the title page:

Change the assignee to read:
 [73] Assignee: Stanley Electric Co., Ltd., Japan Column 2, line 32, change "2" to --z--

Column 2, line 34, after "one" insert --of the--

Column 2, line 60, change "26" to --2b--

Column 4, line 26, before "pivot" insert --a--

Signed and Sealed this

Twenty-eighth Day of September, 1993

Attest:

BRUCE LEHMAN

*Attesting Officer*  *Commissioner of Patents and Trademarks*